United States Patent
Rashid et al.

(10) Patent No.: US 8,218,696 B2
(45) Date of Patent: Jul. 10, 2012

(54) RECEIVING APPARATUS, RECEIVING METHOD, INTEGRATED CIRCUIT, DIGITAL TELEVISION RECEIVER, AND PROGRAM

(75) Inventors: Mahbub Rashid, Osaka (JP); Tomohiro Kimura, Osaka (JP)

(73) Assignee: Panasonic Corporation, Osaka (JP)

( * ) Notice: Subject to any disclaimer, the term of this patent is extended or adjusted under 35 U.S.C. 154(b) by 191 days.

(21) Appl. No.: 12/663,745

(22) PCT Filed: Apr. 9, 2009

(86) PCT No.: PCT/JP2009/001657
§ 371 (c)(1),
(2), (4) Date: Jun. 14, 2010

(87) PCT Pub. No.: WO2009/125599
PCT Pub. Date: Oct. 15, 2009

(65) Prior Publication Data
US 2010/0283902 A1    Nov. 11, 2010

(30) Foreign Application Priority Data

Apr. 10, 2008    (JP) .................... 2008-102274

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl. ........ 375/346; 375/260; 375/285; 375/350; 375/331; 375/332; 455/570; 455/296; 455/307; 348/607

(58) Field of Classification Search .................. 375/346, 375/260, 340, 350, 349, 331, 332, 285; 455/570, 455/296, 307; 348/607
See application file for complete search history.

(56) References Cited

U.S. PATENT DOCUMENTS

| 6,351,462 | B1 | 2/2002 | Komatsu |
| 7,532,864 | B2 * | 5/2009 | Fukuoka et al. ........... 455/67.13 |
| 2005/0147025 | A1 | 7/2005 | Auer |

(Continued)

FOREIGN PATENT DOCUMENTS

EP    1 748 610    1/2007

(Continued)

OTHER PUBLICATIONS

International Search Report issued May 12, 2009 in International (PCT) Application No. PCT/JP2009/001657.

(Continued)

*Primary Examiner* — Phuong Phu
(74) *Attorney, Agent, or Firm* — Wenderoth, Lind & Ponack, L.L.P.

(57) ABSTRACT

In a receiving apparatus (100), a noise power estimation unit (107) estimates the noise power included in a received signal in the frequency domain. A channel characteristics calculation unit (105) estimates the channel characteristics in accordance with a reference signal included in the received signal. A tap coefficient calculation unit (108) calculates the tap coefficients for a filtering unit (109) in accordance with noise power included in the received signal and with an autocorrelation value for the channel characteristics. The filtering unit (109) calculates an estimated value for the channel characteristics via filtering processing on the channel characteristics in accordance with the tap coefficients.

7 Claims, 6 Drawing Sheets

U.S. PATENT DOCUMENTS

| | | |
|---|---|---|
| 2006/0050774 A1 | 3/2006 | De Marchi |
| 2006/0140297 A1* | 6/2006 | Maltsey et al. ............... 375/260 |
| 2006/0199557 A1* | 9/2006 | Kimata et al. ................ 455/213 |
| 2007/0009023 A1* | 1/2007 | Kimata et al. ................ 375/229 |
| 2009/0103666 A1* | 4/2009 | Zhao et al. ................... 375/341 |

FOREIGN PATENT DOCUMENTS

| | | |
|---|---|---|
| JP | 11-27330 | 1/1999 |
| JP | 11-112386 | 4/1999 |
| JP | 2005-527153 | 9/2005 |
| JP | 2006-514499 | 4/2006 |
| JP | 2007-37151 | 2/2007 |

OTHER PUBLICATIONS

Hayashi, K. et al., *Development of Key Technologies for OFDM Receiver—Application for Digital Terrestrial Television Broadcasting, ITE Technical Report*, vol. 23, No. 28 (Mar. 24, 1999), pp. 25-30, Fig. 4 (and English Translation).

* cited by examiner

RECEIVING APPARATUS, RECEIVING METHOD, INTEGRATED CIRCUIT, DIGITAL TELEVISION RECEIVER, AND PROGRAM

TECHNICAL FIELD

The present invention relates to a received signal, the signal being transmitted by a multi-carrier transmission method, and to technology for applying adaptive processing to estimated channel characteristics.

BACKGROUND ART

Multi-carrier transmission methods are generally known as transmission methods with excellent resistance in a multipath environment. Because of these excellent characteristics, OFDM (Orthogonal Frequency Division Multiplexing), a multi-carrier transmission method which transmits over a plurality of orthogonal carriers, is used in digital terrestrial broadcasting and in wireless LANs (Local Area Networks).

An explanation is now provided for a receiving system using the example of digital terrestrial broadcasting. Standards for digital terrestrial broadcasting that use OFDM include the Japanese ISDB-T (Integrated Services Digital Broadcasting for Terrestrial) or the European DVB-T (Digital Video Broadcasting-Terrestrial). These standards insert a pilot signal, called an SP (Scattered Pilot), which is modulated at a predetermined amplitude and phase, into the transmission signal as a reference signal. At the receiving end, a method for demodulating and equalizing the received signal with reference to the amplitude and phase of the SP signal is used.

The SP signal determined by the above-mentioned standard is inserted once every 12 carriers in the carrier direction (frequency direction), and once every four symbols in the symbol direction (time direction).

FIG. 6 shows the basic structure of a digital terrestrial broadcasting receiver, a receiving apparatus. The receiving apparatus 500 comprises an antenna 501, a tuner unit 502, a synchronizing unit 503, an FFT (Fast Fourier Transform) unit 504, an equalizing unit 509, an error correction unit 510, and a channel estimation unit 511.

The channel estimation unit 511 includes an SP extraction unit 505, a known signal unit 506, a division unit 507, and an interpolation unit 508.

Letting a transmission signal be X(l, k), the channel characteristics and the noise component affecting the transmission signal be H(l, k) and N(l, k) respectively, and the received signal for this transmission signal be Y(l, k), then the following relationship (Equation 1) between these elements holds.

$$Y(l,k)=X(l,k)H(l,k)+N(l,k) \quad \text{Equation 1}$$

In this equation, l is a symbol number, and k is a carrier number.

Within the channel estimation unit 511, the SP extraction unit 505 extracts an SP signal Y(l, $k_p$) from the OFDM signal converted into a signal in the frequency domain by the FFT unit 504.

The known signal unit 506 outputs a known signal X(l, $k_p$) which indicates a predetermined amplitude, a predetermined phase, etc. for an SP signal known at the receiving end.

The division unit 507 estimates the channel characteristics $\hat{H}$(l, $k_p$) affecting the known signal X(l, $k_p$), as acquired from the known signal unit 506, by dividing the extracted SP signal Y(l, $k_p$) by X(l, $k_p$), as in Equation 2 below.

$$\hat{H}(l, k_p) = \frac{Y(l, k_p)}{X(l, k_p)} = H(l, k_p) + \frac{N(l, k_p)}{X(l, k_p)} \quad \text{Equation 2}$$

"H^" is written in the present text because of character code constraints, yet writing "^" above "H" as in Equation 2 is actually appropriate. The same is true for "X^" and "Y^" below.

The interpolation unit 508 estimates $\hat{H}$(l, $k_d$), the channel characteristics for data carrier signals other than the SP signal, by interpolating $\hat{H}$(l, $k_p$), the channel characteristics for this SP signal, in the symbol direction (time direction) and the frequency direction (carrier direction). Data after equalization are sought as in Equation 3 by dividing the data carrier signal by the estimated channel characteristics.

$$\hat{X}(l,k_d)=Y(l,k_d)/\hat{H}(l,k_d) \quad \text{Equation 3}$$

If the noise component is small enough to be ignored, the second element in the right hand side of Equation 2 can be ignored. In this case, the channel characteristics $\hat{H}$(l, $k_p$) for the SP signal can be sought nearly accurately and are equivalent to H(l, $k_p$). In an actual receiving environment, however, a noise component is superimposed. Thus the effects of noise cannot be ignored, and an estimated error is included in the channel characteristics $\hat{H}$(l, $k_p$).

Since the SP signal thus includes an estimated error, an estimated error also exists in the channel characteristics $\hat{H}$(l, $k_d$) for the data carrier signal estimated by interpolation processing which uses the channel characteristics $\hat{H}$(l, $k_p$) for the SP signal. Therefore, the estimation precision of the channel characteristics deteriorates. So as not to worsen receiver performance, then, it is preferable to remove the noise component which causes estimation error when estimating a channel.

With regards to this issue, Patent Document 1 (Japanese Unexamined Patent Publication No. 2005-527153) proposes a method for estimating a channel via adaptive processing that uses a principle such as a Wiener filter. FIG. 7 is a block diagram of the receiving apparatus in Patent Document 1.

As shown in FIG. 7, the receiving apparatus 600 comprises an antenna 601, a tuner unit 602, a synchronizing unit 603, an FFT unit 604, an equalizing unit 609, a channel estimation unit 605, an autocorrelation calculation unit 606, a tap coefficient calculation unit 607, and a filtering unit 608.

The channel estimation unit 605 seeks the channel characteristics for the pilot signal, and outputs said channel characteristics to the autocorrelation calculation unit 606. The autocorrelation calculation unit 606 calculates the autocorrelation function for the channel characteristics, and supplies the calculated autocorrelation value to the tap coefficient calculating unit. The tap coefficient calculation unit 607 determines the tap coefficients for the noise removal filter, in accordance with the autocorrelation value supplied by the autocorrelation calculation unit 606. The filtering unit 608 performs filtering processing on the channel characteristics provided by the channel estimation unit 605 using the tap coefficients output from the tap coefficient calculation unit 607 and outputs the filtered channel characteristics to the equalizing unit 609.

CITATION LIST

Patent Literature

Patent Document 1: Tokuhyo (published Japanese translation of PCT international publication for patent application) No. 2005-527153.

SUMMARY OF INVENTION

Technical Problem

In Patent Document 1, adaptive processing that uses a principle such as a Wiener filter is performed. During such adaptive processing, a desired signal (e.g. desired channel characteristics) is required.

Patent Document 1, however, discloses neither a method for calculating nor a method for obtaining the desired channel characteristics. Moreover, it does not disclose the steps for determining a filter from the autocorrelation function of the desired channel characteristics.

The present invention was conceived in view of this background, and it is an object of the present invention to provide a receiving apparatus which, even when the desired channel characteristics are unknown, can perform effective adaptive processing to thereby improve the accuracy of channel estimation and, as a result, contribute to improving receiver performance.

Solution to Problem

The above-described object is fulfilled by a receiving apparatus comprising a conversion unit operable to convert a received signal, the signal being transmitted by a multi-carrier transmission method, from a time domain into a frequency domain; a noise power estimation unit operable to estimate, in accordance with the signal converted into the frequency domain, a noise power included therein; a channel characteristics estimation unit operable to estimate channel characteristics in accordance with a reference signal included in the signal converted into the frequency domain; an autocorrelation calculation unit operable to calculate an autocorrelation value for the estimated channel characteristics; a tap coefficient calculation unit operable to calculate tap coefficients in accordance with the noise power estimated by the noise power estimation unit and the autocorrelation value calculated by the autocorrelation calculation unit; and a filtering unit operable to perform filtering on the channel characteristics in accordance with the tap coefficients calculated by the tap coefficient calculation unit.

In the above-stated receiving apparatus, the tap coefficient calculation unit may include an autocorrelation matrix generation subunit operable to generate an autocorrelation matrix in accordance with the autocorrelation value; an inverse matrix calculation subunit operable to calculate an inverse matrix for the autocorrelation matrix; and a coefficient calculation subunit operable to calculate tap coefficients for a noise removal filter by multiplying each element in the inverse matrix by the noise power and subtracting the result from an identity matrix.

In the above-stated receiving apparatus, the inverse matrix calculation subunit may add a pre-established offset component to diagonal elements in the autocorrelation matrix.

In another aspect, the present invention provides a method for receiving, comprising the steps of: converting a received signal, the signal being transmitted by a multi-carrier transmission method, from a time domain into a frequency domain; estimating, in accordance with the signal converted into the frequency domain, a noise power included therein; estimating channel characteristics in accordance with a reference signal included in the signal converted into the frequency domain; calculating an autocorrelation value for the estimated channel characteristics; calculating tap coefficients in accordance with the noise power estimated by the noise power estimation step and the autocorrelation value calculated by the autocorrelation calculation step; and performing filtering on the channel characteristics in accordance with the tap coefficients calculated by the tap coefficient calculation step.

In another aspect, the present invention provides an integrated circuit comprising: a conversion unit operable to convert a received signal, the signal being transmitted by a multi-carrier transmission method, from a time domain into a frequency domain; a noise power estimation unit operable to estimate, in accordance with the signal converted into the frequency domain, a noise power included therein; a channel characteristics estimation unit operable to estimate channel characteristics in accordance with a reference signal included in the signal converted into the frequency domain; an autocorrelation calculation unit operable to calculate an autocorrelation value for the estimated channel characteristics; a tap coefficient calculation unit operable to calculate tap coefficients in accordance with the noise power estimated by the noise power estimation unit and the autocorrelation value calculated by the autocorrelation calculation unit; and a filtering unit operable to perform filtering on the channel characteristics in accordance with the tap coefficients calculated by the tap coefficient calculation unit.

In another aspect, the present invention provides a digital television receiver comprising: a conversion unit operable to convert a received signal, the signal being transmitted by a multi-carrier transmission method, from a time domain into a frequency domain; a noise power estimation unit operable to estimate, in accordance with the signal converted into the frequency domain, a noise power included therein; a channel characteristics estimation unit operable to estimate channel characteristics in accordance with a reference signal included in the signal converted into the frequency domain; an autocorrelation calculation unit operable to calculate an autocorrelation value for the estimated channel characteristics; a tap coefficient calculation unit operable to calculate tap coefficients in accordance with the noise power estimated by the noise power estimation unit and the autocorrelation value calculated by the autocorrelation calculation unit; and a filtering unit operable to perform filtering on the channel characteristics in accordance with the tap coefficients calculated by the tap coefficient calculation unit.

In another aspect, the present invention provides a computer program causing a computer to perform processing comprising the steps of: converting a received signal, the signal being transmitted by a multi-carrier transmission method, from a time domain into a frequency domain; estimating, in accordance with the signal converted into the frequency domain, a noise power included therein; estimating channel characteristics in accordance with a reference signal included in the signal converted into the frequency domain; calculating an autocorrelation value for the estimated channel characteristics; calculating tap coefficients in accordance with the noise power estimated by the noise power estimation step and the autocorrelation value calculated by the autocorrelation calculation step; and performing filtering on the channel characteristics in accordance with the tap coefficients calculated by the tap coefficient calculation step.

Advantageous Effects of Invention

In particular, the receiving apparatus in the present invention is provided with a tap coefficient calculation unit operable to calculate tap coefficients in accordance with the noise power estimated by the noise power estimation unit and the autocorrelation value calculated by the autocorrelation calculation unit, and as the filtering unit performs filtering processing on the channel characteristics in accordance with the tap coefficients calculated by the tap coefficient calculation unit, even if the desired channel characteristics are unknown, the tap coefficients can be calculated, and efficient adaptive processing can be performed.

Furthermore, the tap coefficient calculation unit includes an autocorrelation matrix generation unit to generate an autocorrelation matrix in accordance with the autocorrelation value, an inverse matrix calculation unit to calculate an inverse matrix for the autocorrelation matrix, and a coefficient calculation unit to calculate the tap coefficients for the noise removal filter by multiplying each element in the inverse matrix by the noise power and subtracting the result from an identity matrix. Thus, the tap coefficients with differing delays used in filtering can be sought collectively.

Furthermore, by adding a pre-established offset component to the diagonal elements in the autocorrelation matrix, it is possible to ensure calculation accuracy of the inverse matrix even when there is no noise component in the channel characteristics or the noise component is extremely small. It is also possible to suppress the occurrence of calculation error in the calculation of tap coefficients, and thus to estimate appropriate channel characteristics.

DESCRIPTION OF EMBODIMENTS

The following describes one embodiment of the present invention, with reference to the attached drawings.

Embodiment

Figure 1:
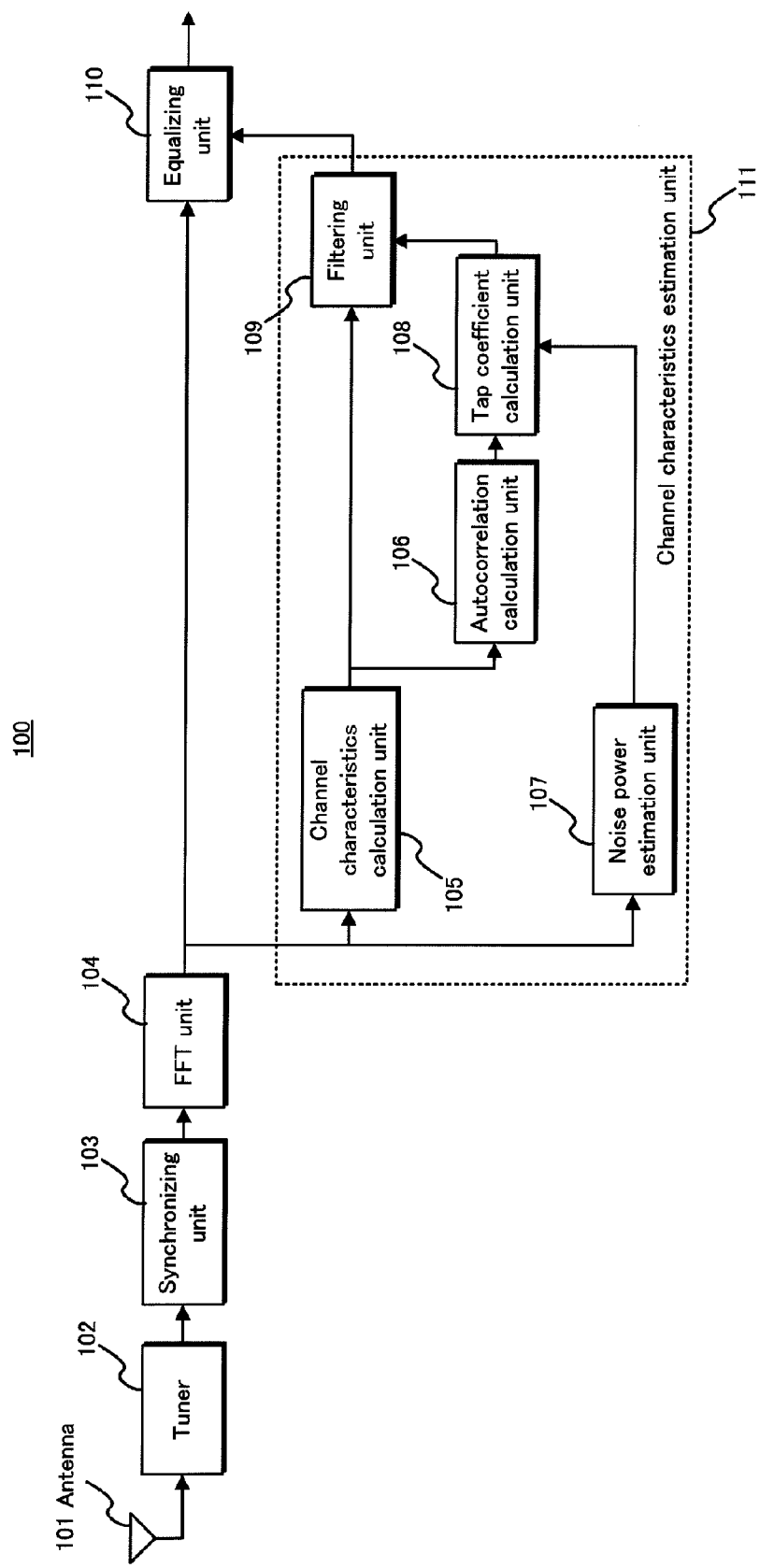
FIG. 1 is a block diagram showing the structure of the receiving apparatus 100 in the embodiment of the present invention.

FIG. 1 is a block diagram showing the structure of the receiving apparatus in the present embodiment. The receiving apparatus 100 includes an antenna 101, a tuner unit 102, a synchronizing unit 103, an FFT unit 104, an equalizing unit 110, and a channel characteristics estimation unit 111.

The antenna 101 receives a multi-carrier transmission signal transmitted by a transmitter station (not displayed).

The tuner unit 102 tunes into a desired channel's signal from among the multi-carrier transmission signal received by the antenna 101, performs frequency conversion, and outputs the signal as a received signal.

The synchronizing unit 103 estimates the symbol timing, etc. based on the received signal that the tuner unit 102 outputs. It then notifies the FFT unit 104 of the estimated symbol timing, etc.

The FFT unit 104 converts the received signal in the time domain, output by the synchronizing unit 103, into a signal in the frequency domain.

The channel characteristics estimation unit 111 estimates (calculates) the channel characteristics based on the received signal in the frequency domain, output by the FFT unit 104.

The equalizing unit 110 equalizes the received signal in the frequency domain, output by the FFT unit 104, based on the channel characteristics estimated by the channel characteristics estimation unit 111.

The channel characteristics estimation unit 111 includes a channel characteristics calculation unit 105, an autocorrelation calculation unit 106, a noise power estimation unit 107, a tap coefficient calculation unit 108, and a filtering unit 109.

A detailed explanation of the channel characteristics estimation unit 111 is provided below.

The channel characteristics calculation unit 105 calculates channel characteristics based on the SP signal included in the received signal in the frequency domain provided by the FFT unit 104 and outputs the calculated channel characteristics.

The autocorrelation calculation unit 106 calculates the autocorrelation value for the channel characteristics output by the channel characteristics calculation unit 105 and outputs the calculated autocorrelation value.

The noise power estimation unit 107 estimates and outputs the noise power included in the received signal in the frequency domain provided by the FFT unit 104. The noise power can be estimated, for example, based on the difference between the estimated received signal and the actual received signal.

Concretely, the noise power estimation unit 107 obtains the channel characteristics $\hat{H}_{TMCC}$ for the TMCC (Transmission Multiplexing Configuration Control) signal from the channel characteristics calculation unit 105.

Furthermore, the noise power estimation unit 107 estimates the TMCC signal $\hat{X}_{TMCC}$ for the transmission signal from the received signal in the frequency domain, provided by the FFT unit 104. The product of these two values, $\hat{H}_{TMCC} \cdot \hat{X}_{TMCC}$, becomes the estimated value $\hat{Y}_{TMCC}$ for the TMCC received signal which is expected to be received based on the channel characteristics estimated by the channel characteristics calculation unit 105.

The noise power is estimated by seeking the difference between this estimated received signal $\hat{Y}_{TMCC}$ and the actually received signal $Y_{TMCC}$. Here, noise power is averaged over symbols of a predetermined length.

Figure 2:
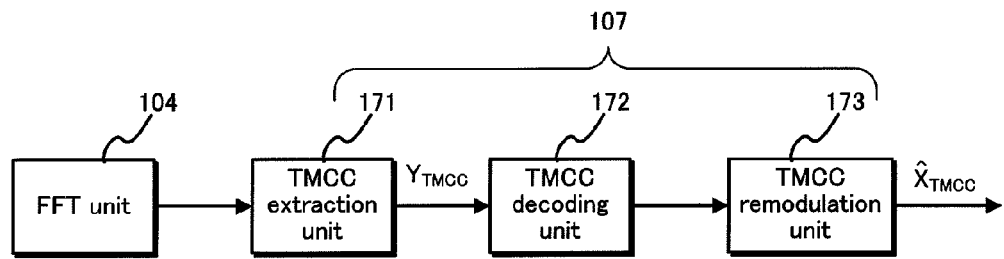
FIG. 2 is a block diagram showing part of the structure of the noise power estimation unit 107.

The following is an explanation, with reference to the attached figures, of the method for estimating the TMCC signal $\hat{X}_{TMCC}$ for the transmission signal based on the received signal for the frequency domain, provided by the FFT unit 104. Estimation of the TMCC signal in FIG. 2 comprises a TMCC extraction unit 171, a TMCC decoding unit 172, and a TMCC remodulation unit 173. Note that the arrangement of the TMCC signal generated at the transmitting end is known at the receiving end, and as the TMCC signal undergoes DBPSK (Differential Binary Phase Shift Keying) in the symbol direction and the TMCC signals arranged in a plurality of carriers in a single symbol all transmit the same control information, the processing described below for the TMCC extraction unit 171, the TMCC decoding unit 172, and the TMCC remodulation unit 173 is possible.

The TMCC extraction unit 171 extracts a TMCC signal from the OFDM transmission signal (received signal) in the frequency domain, provided by the FFT unit 104, and outputs the extracted TMCC signal to the TMCC decoding unit 172.

The TMCC decoding unit 172 applies demodulation processing for DBPSK to the TMCC signal input by the TMCC extraction unit 171 and decodes the control information transmitted by the TMCC signal. The TMCC decoding unit 172 then outputs the control information to the TMCC remodulation unit 173. However, as the TMCC signals arranged in a plurality of carriers in a single symbol all transmit the same control information, the TMCC decoding unit specifies the transmitted control information by making a majority decision regarding the transmitted control information in accordance with a plurality of control information decoded from one signal. This improves the decoded control information.

The TMCC remodulation unit 173 performs DBPSK on the control information input from the TMCC decoding unit 172, estimates the TMCC signal's modulation phase for the transmitting end, and outputs the signal acquired by DBPSK.

In accordance with the autocorrelation value output by the autocorrelation calculation unit 106 and the noise power output by the noise power estimation unit 107, the tap coefficient calculation unit 108 calculates the tap coefficients for the noise removal filter in the filtering unit 109 and outputs these coefficients.

The filtering unit 109 uses the tap coefficients provided by the tap coefficient calculation unit 108 to perform filtering processing on the channel characteristics provided by the channel characteristics calculation unit 105 and outputs the channel characteristics whose noise has been reduced via the filtering processing.

Figure 3:
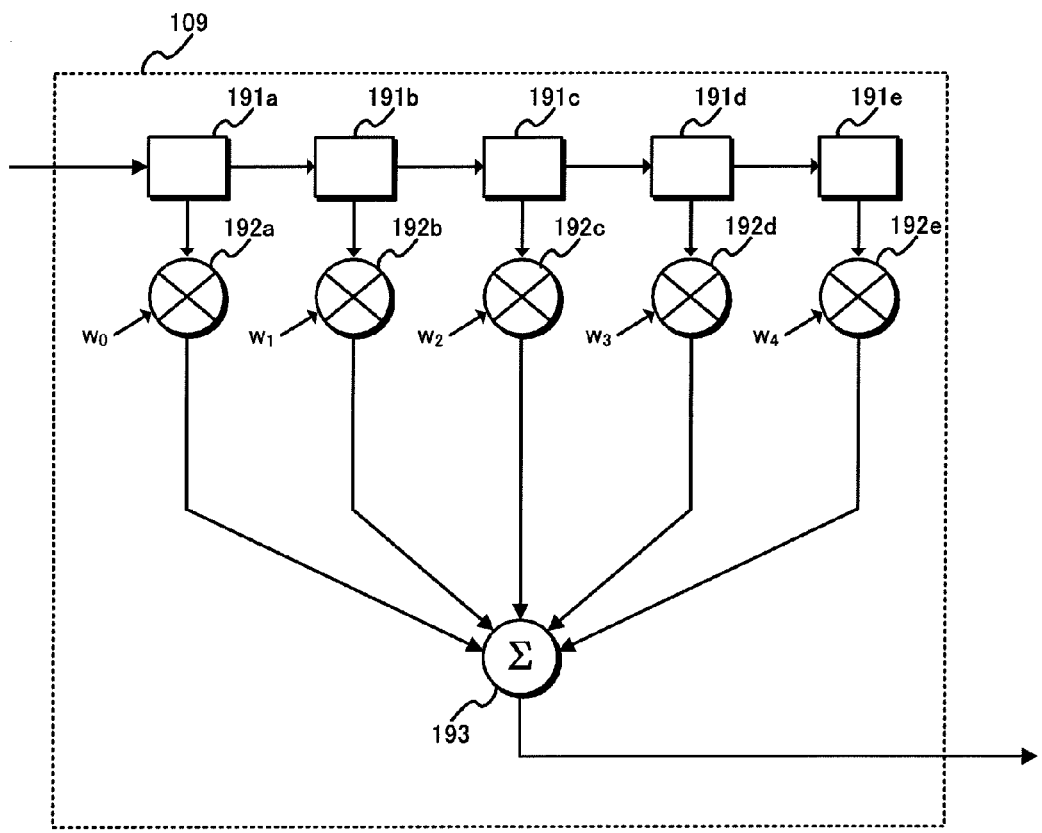
FIG. 3 shows an example structure of the noise removal filter in the filtering unit 109.

FIG. 3 shows an example of the structure of the noise removal filter in the filtering unit 109.

The type of noise removal filter in the filtering unit 109 is commonly called a transversal filter. In the example in FIG. 3, the number of taps is five. The filtering unit 109 includes five delay devices 191a-191e, five multiplying devices 192a-192e used to multiply each of the tap coefficients W0-W4, and an adding device 193 for adding the output from the multiplying devices 192a-192e.

The channel characteristics output by a unit such as the filtering unit 109 are provided to the equalizing unit 110 as the channel characteristics estimated by the channel characteristics estimation unit 111. While not shown in FIG. 1, the equalized signal from the equalizing unit 110 is provided to an error correction unit. The signal corrected for error by the error correction unit passes through the AV decoding unit, after which it is output both as video by the display and as audio by the speakers.

A detailed explanation is now provided regarding the operation of the receiving apparatus 100 constructed in this way in the present embodiment, in particular regarding the processing for seeking the tap coefficients for the noise removal filter from the received signal in the frequency domain. For the sake of simplicity, in this explanation the number of taps in the noise removal filter used in the filtering unit 109 is five.

The channel characteristics calculation unit 105 calculates the channel characteristics for the received signal in the frequency domain. For example, in the case of a receiver for digital terrestrial broadcasting, the pilot signal inserted into the transmission signal is known at the transmitting end, and the channel characteristics calculation unit 105 seeks the channel characteristics for the pilot signal by dividing the received pilot signal by the known pilot signal. The channel characteristics calculation unit 105 provides the channel characteristics for the pilot signal sought in the above-described way to the autocorrelation calculation unit 106.

The autocorrelation calculation unit 106 calculates the autocorrelation value for the channel characteristics provided by the channel characteristics calculation unit 105 and provides this autocorrelation value in vector form to the tap coefficient calculation unit 108. This autocorrelation value can be expressed as in Equation 4.

$$r=[r_0 r_1 r_2 r_3 r_4] \quad \text{Equation 4}$$

The autocorrelation values sought by the autocorrelation calculation unit 106 are autocorrelation values among the filter taps for the channel characteristics that are the target of filtering processing in the filtering unit 109.

Since the number of taps in the noise removal filter used in the filtering unit 109 is five, there are five elements in the vector in Equation 4. Letting the channel characteristics be $h_1(m)$, the autocorrelation value $r_i$ is expressed in Equation 5. In this equation, "m" is the index of channel characteristics that are the target of filtering processing in the filtering unit 109, and "i" is the filter tap interval for seeking autocorrelation. Also, in Equation 5, $E[\cdot]$ expresses the expectation value calculation.

$$r_i = E[h_1(m) \cdot h_1^*(m-i)] \quad \text{Equation 5}$$

Next, an explanation is provided for the calculation method whereby the tap coefficient calculation unit 108 seeks the tap coefficients for the noise removal filter based on the autocorrelation value output from the autocorrelation calculation unit 106 and the noise power output by the noise power estimation unit 107.

The optimal tap coefficients are calculated using a Wiener-Hopf equation, well known in the adaptive filter field. The Wiener-Hopf equation is shown in Equation 6.

$$w = R_{xx}^{-1} r_{dx} \quad \text{Equation 6}$$

As shown in Equation 6, the set of optimal tap coefficients is obtained as a column vector "w." To seek the optimal tap coefficients "w" using the Wiener-Hopf equation, two amounts are necessary. The first is the autocorrelation matrix $R_{xx}$ for the channel characteristics that are the input for the filter. The second is the cross-correlation vector $r_{dx}$ for the channel characteristics that are the input for the filter and the desired channel characteristics.

The autocorrelation matrix $R_{xx}$ for the channel characteristics can be generated as a Toeplitz matrix as shown in Equation 7, having as elements the autocorrelation values $r_i$ and their complex conjugates $r_i^*$, output by the autocorrelation calculation unit 106.

$$R_{xx} = \begin{bmatrix} r_0 & r_1 & r_2 & r_3 & r_4 \\ r_1^* & r_0 & r_1 & r_2 & r_3 \\ r_2^* & r_1^* & r_0 & r_1 & r_2 \\ r_3^* & r_2^* & r_1^* & r_0 & r_1 \\ r_4^* & r_3^* & r_2^* & r_1^* & r_0 \end{bmatrix} \quad \text{Equation 7}$$

To obtain the cross-correlation vector $r_{dx}$ for the channel characteristics and the desired channel characteristics, the desired channel characteristics are necessary, yet these are unknown. However, since the channel characteristics are estimated from the received signals that include a noise component, it is considered that the desired channel characteristics are not influenced by the noise component. In the present invention, the noise power is estimated from the received signal, and a method is used to obtain the cross-correlation vector $r_{dx}$ by subtracting a separately estimated noise power "n" from the autocorrelation values $r_i$ sought in Equation 5. The cross-correlation vector $r_{dx}$ sought with this method can be expressed as in Equation 8. In Equation 8, noise is assumed to be white noise. Also, the delays for the noise removal filter used in the filtering unit 109 are assumed to be two samples.

$$r_{dx} = \begin{bmatrix} r_2 \\ r_1 \\ r_0 - n \\ r_1^* \\ r_2^* \end{bmatrix} \quad \text{Equation 8}$$

By substituting the autocorrelation matrix $R_{xx}$ sought in Equation 7 and the cross-correlation vector $r_{dx}$ sought in Equation 8 in the Wiener-Hopf equation in Equation 6, the optimal tap coefficients for the noise removal filter in the filtering unit 109 can be sought. In other words, the tap coefficient calculation unit 108 seeks the tap coefficients "w" for the noise removal filter in the filtering unit 109 by performing the calculations in Equations 6 through 8 based on the autocorrelation value $r_i$ sought by the autocorrelation calculation unit 106 and the noise power "n" sought by the noise power estimation unit 107.

Generalizing the delays in the noise removal filter in the filtering unit 109 to sample "d" and letting the corresponding tap coefficients be $w_d$ and the cross-correlation vector $r_{dx}(d)$, then the Wiener-Hopf equation can be expressed as in Equation 9.

$$w_d = R_{xx}^{-1} r_{dx}^{(d)} \quad \text{Equation 9}$$

Equation 10 expresses a matrix W, wherein, when the delays "d" for the delay devices 191a-191e in the noise removal filter in the filtering unit 109 are 0 through 4, the optimal tap coefficients w0 through w4 are lined up in rows.

$$W = \begin{bmatrix} w_0 & w_1 & w_2 & w_3 & w_4 \end{bmatrix} = \begin{bmatrix} w_{00} & w_{01} & w_{02} & w_{03} & w_{04} \\ w_{10} & w_{11} & w_{12} & w_{13} & w_{14} \\ w_{20} & w_{21} & w_{22} & w_{23} & w_{24} \\ w_{30} & w_{31} & w_{32} & w_{33} & w_{34} \\ w_{40} & w_{41} & w_{42} & w_{43} & w_{44} \end{bmatrix} \quad \text{Equation 10}$$

Equation 11 expresses the cross-correlation matrix $R_{dx}$.

$$R_{dx} = \begin{bmatrix} r_{dx}^{(0)} & r_{dx}^{(1)} & r_{dx}^{(2)} & r_{dx}^{(3)} & r_{dx}^{(4)} \end{bmatrix} \quad \text{Equation 11}$$

$$= \begin{bmatrix} r_0 - n & r_1 & r_2 & r_3 & r_4 \\ r_1^* & r_0 - n & r_1 & r_2 & r_3 \\ r_2^* & r_1^* & r_0 - n & r_1 & r_2 \\ r_3^* & r_2^* & r_1^* & r_0 - n & r_1 \\ r_4^* & r_3^* & r_2^* & r_1^* & r_0 - n \end{bmatrix}$$

The Wiener-Hopf equation for seeking the tap coefficient matrix W becomes Equation 12.

$$W = R_{xx}^{-1} R_{dx} \quad \text{Equation 12}$$

When the cross-correlation matrix $R_{dx}$ shown in Equation 11 is expanded by matrix operation, it can be expressed in terms of the autocorrelation matrix $R_{xx}$ and the noise power "n," as in Equation 13. In Equation 13, I represents an identity matrix.

$$R_{dx} = \begin{bmatrix} r_0 & r_1 & r_2 & r_3 & r_4 \\ r_1^* & r_0 & r_1 & r_2 & r_3 \\ r_2^* & r_1^* & r_0 & r_1 & r_2 \\ r_3^* & r_2^* & r_1^* & r_0 & r_1 \\ r_4^* & r_3^* & r_2^* & r_1^* & r_0 \end{bmatrix} - n \begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix} \quad \text{Equation 13}$$

$$= R_{xx} - nI$$

By substituting Equation 13 into Equation 12, the tap coefficient matrix W can be expressed as in Equation 14.

$$W = R_{xx}^{-1} R_{dx} \quad \text{Equation 14}$$

$$= R_{xx}^{-1}(R_{xx} - nI)$$

$$= I - nR_{xx}^{-1}$$

Equation 14 allows for the optimal tap coefficients $w_d$ with different delays "d" to be sought collectively as the tap coefficient matrix W.

Not all of the tap coefficients in the set sought in Equation 14 $w_d$ need to be used, and it is possible to use only a freely chosen portion thereof.

When the delay "d" is near the minimum (0 in the present embodiment) or the maximum (4 in the present embodiment), the tap coefficients $w_d$ are useful as tap coefficients for use in filtering processing near the start and the end of the channel characteristics being sought in the filtering unit 109. Conversely, the noise removal effect is high for tap coefficients $w_d$ for an intermediate delay "d," and these coefficients are useful as tap coefficients for use in filtering processing other than at the start and the end of the channel characteristics being sought in the filtering unit 109.

Figure 4:
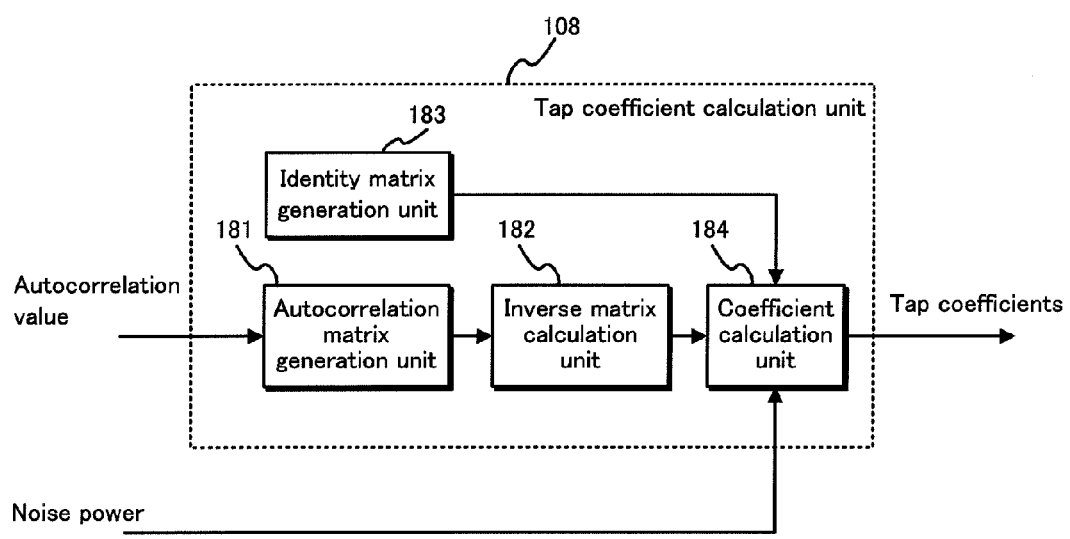
FIG. 4 is a block diagram showing the structure of the tap coefficient calculation unit 108.

FIG. 4 is a block diagram showing the structure of the tap coefficient calculation unit. The tap coefficient calculation unit 108 is composed of an autocorrelation matrix generation unit 181, an inverse matrix calculation unit 182, an identity matrix generation unit 183, and a coefficient calculation unit 184. The autocorrelation matrix generation unit 181 generates an autocorrelation matrix $R_{xx}$ using the autocorrelation values r0 through r4 provided by the autocorrelation calculation unit 106, as well as their complex conjugates. The inverse matrix calculation unit 182 calculates the inverse matrix $R_{xx}^{-1}$ for the autocorrelation matrix $R_{xx}$ generated by the autocorrelation matrix generation unit 181. The identity matrix generation unit 183 generates an identity matrix I. The coefficient calculation unit 184 calculates the tap coefficients W for the noise removal filter according to Equation 14, based on the inverse matrix $R_{xx}^{-1}$ of the autocorrelation matrix provided by the inverse matrix calculation unit 182, the identity matrix I provided by the identity matrix generation unit 183, and the noise power "n" provided by the noise power estimation unit 107. The coefficient calculation unit 184 provides the filtering unit 109 either with the sought tap coefficients in their entirety or with a set of a portion thereof.

The inverse matrix calculation unit 182 calculates the inverse matrix $R_{xx}^{-1}$ for the autocorrelation matrix $R_{xx}$ generated by the autocorrelation matrix generation unit 181, yet when there is no noise component in the channel characteristics or the noise component is extremely small, the accuracy of the calculation of the inverse matrix for the autocorrelation matrix may worsen, and thus the inverse matrix for the autocorrelation matrix may not be sought accurately. If an error occurs in the calculation of the inverse matrix in the inverse matrix calculation unit 182, then error will appear in the tap coefficients in the coefficient calculation unit 184, and the noise may be amplified by the filtering unit 109. Therefore, the inverse matrix calculation unit 182 adds a component ($\alpha r_0$), yielded by a pre-established offset coefficient $\alpha$, to the diagonal elements in the autocorrelation matrix $R_{xx}$, as in Equation 15. It then seeks the inverse matrix for the autocorrelation matrix $R_{xx}'$ to which the offset component has been added and provides the result to the coefficient calculation unit 184.

$$R'_{xx} = \begin{bmatrix} r_0 + \alpha \cdot r_0 & r_1 & r_2 & r_3 & r_4 \\ r_1^* & r_0 + \alpha \cdot r_0 & r_1 & r_2 & r_3 \\ r_2^* & r_1^* & r_0 + \alpha \cdot r_0 & r_1 & r_2 \\ r_3^* & r_2^* & r_1^* & r_0 + \alpha \cdot r_0 & r_1 \\ r_4^* & r_3^* & r_2^* & r_1^* & r_0 + \alpha \cdot r_0 \end{bmatrix} \quad \text{Equation 15}$$

Qualitatively, as the noise power "n" approaches 0 in the calculation of the second element in Equation 14, calculation of the inverse matrix becomes difficult as the inverse matrix $R_{xx}^{-1}$ approaches infinity. Even when the noise power "n" has approached 0, processing to add an offset component to the autocorrelation matrix $R_{xx}$ as described above makes the inverse matrix $(R_{xx}')^{-1}$ for the autocorrelation with an added offset component a finite value, and makes it possible to avoid breakdown of calculation of the inverse matrix.

In this way, when the noise power "n" approaches 0, the tap coefficient matrix W approaches the identity matrix I. As the tap coefficient matrix W approaches the identity matrix, the effect of noise removal in the filtering unit 109 lessens, but as the amount of noise is small, it is not problematic for the effect of noise removal to lessen. This processing is more appropriate than increasing noise through error in calculation of the inverse matrix.

Figure 5:
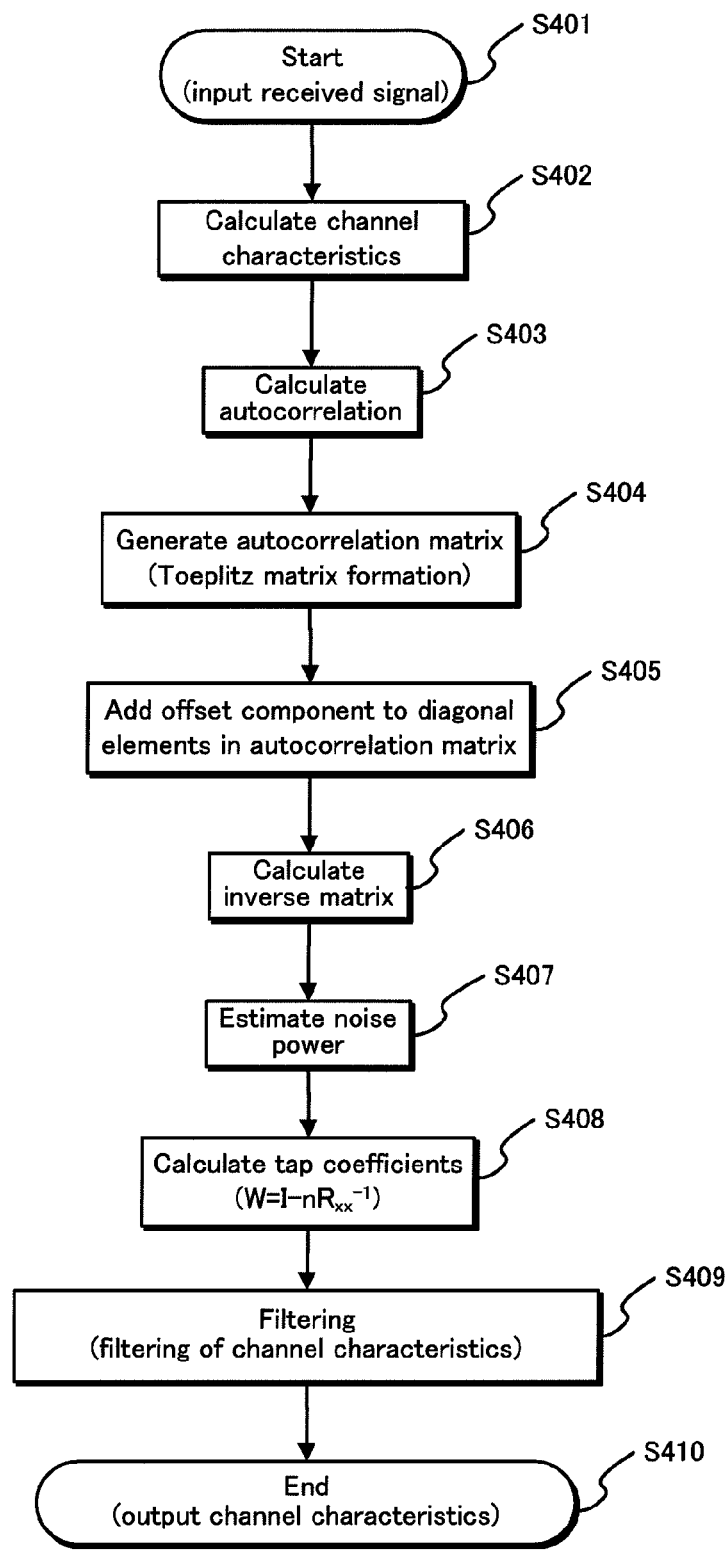
FIG. 5 is a flowchart showing the processing steps in the channel characteristics estimation unit 111.
Figure 6:
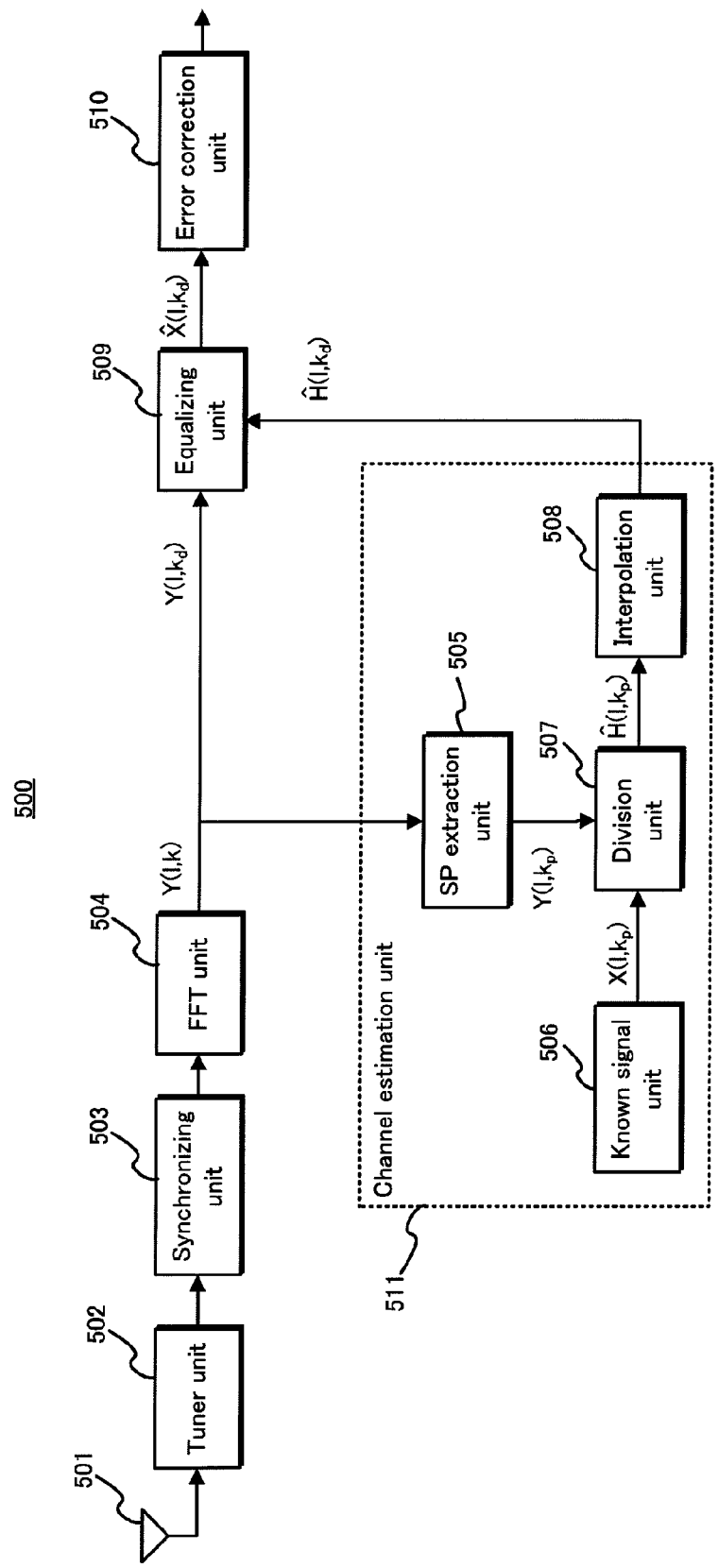
FIG. 6 shows the basic structure of a prior art receiving apparatus.
Figure 7:
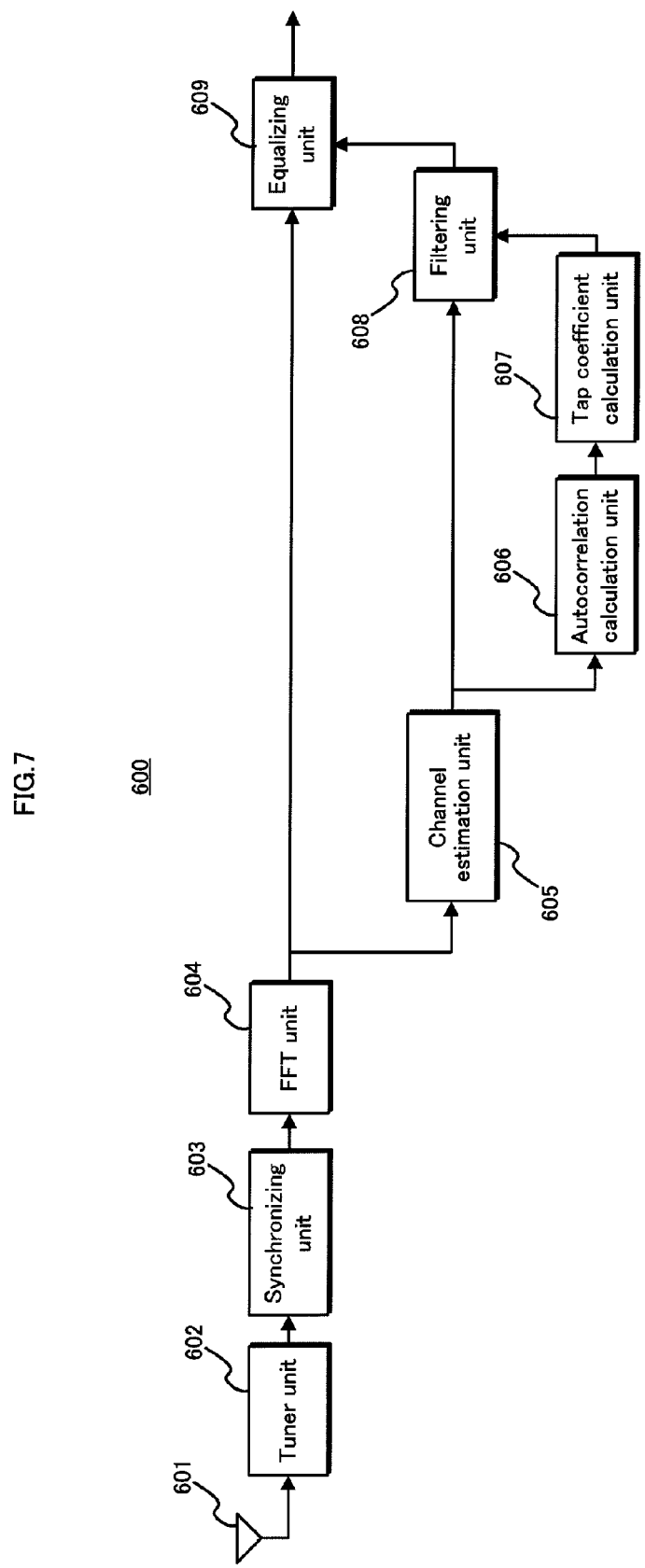
FIG. 7 is a block diagram of the receiving apparatus in Patent Document 1.

FIG. 5 shows the steps for processing in the channel characteristics estimation unit 111.

In FIG. 5, by inputting the received signal in the frequency domain output by the FFT unit 104 into the channel characteristics estimation unit 111, processing in the channel characteristics estimation unit 111 begins (S401). The channel characteristics calculation unit 105 calculates the channel characteristics from the input received signal (S402).

Next, the autocorrelation calculation unit 106 calculates the autocorrelation value for the channel characteristics input from the channel characteristics calculation unit 105 (S403). The autocorrelation matrix generation unit 181 generates an autocorrelation matrix based on the formation of a Toeplitz matrix using the autocorrelation value calculated by the autocorrelation calculation unit 106 (S404). To ensure calculation accuracy of the inverse matrix, a pre-established offset component is added to the diagonal elements in the autocorrelation matrix generated by the autocorrelation matrix generation unit 181 (S405).

Next, the inverse matrix calculation unit 182 calculates the inverse matrix for the autocorrelation matrix which, in step S405, had a pre-established offset component added to its diagonal elements (S406).

The noise power estimation unit 107 estimates the noise power based on the received signal in the frequency domain input from the FFT unit 104 (S407). The coefficient calculation unit 184 calculates the tap coefficients W for the noise removal filter in the filtering unit 109, based on the inverse matrix for the autocorrelation matrix sought in step S406 and the noise power sought in step S407 (S408).

Next, the filtering unit 109 performs filtering processing on the channel characteristics provided by the channel characteristics calculation unit 105, using the tap coefficients W provided by the tap coefficient calculation unit 108 (S409). Finally, processing of the channel characteristics estimation unit 111 ends when the channel characteristics that underwent filtering processing are provided to the equalizing unit 110 (S410). Step 407 to estimate the noise power can be anywhere after step S401 and before step S408. That is, step S407 can be inserted anywhere between steps S402 and S406, or before or after these steps.

<Supplementary Remarks>

This concludes the description of the embodiment of the present invention. The present invention is not, however, limited to the above description, and a variety of embodiments is possible to achieve the objects of the present invention, related objects, or associated objects, such as the embodiments listed hereinafter.

(1) In the embodiment, an example of a filter with five taps was described, but the number of taps is not limited to five; rather, a freely chosen number of taps can be used.

(2) Details were not provided in the embodiment, but during the processing between the channel characteristics calculation unit 105 and the filtering unit 109, or at a stage before or after such processing, interpolation may be performed on the channel characteristics.

(3) In the embodiment, a description was provided of how the noise power estimation unit 107 estimates noise power using a TMCC pilot signal, TMCC being used as an ISDB-T standard.

The present invention is not limited to this signal, however, and estimation of noise power can use a CP (Continual Pilot) signal or a TPS (Transmission Parameters Signaling) signal, which are used in the DVB-T standard.

(4) A control program consisting of program code to cause a processor in the receiving apparatus or the like, and a variety of circuits connected to the processor, to execute the operations and processing shown for the embodiment may be recorded on a recording medium, or circulated and distributed via a variety of communication channels.

Examples of such a recording medium include an IC card, a hard disk, an optical disc, a flexible disk, ROM, etc.

The circulated and distributed control program is stored for use in the readable memory of a processor, and by executing the control program, the processor implements each of the functions shown in the embodiment.

(5) The receiving apparatus in the embodiment can be typically implemented as an LSI (Large Scale Integration) integrated circuit. Each circuit can be a separate chip, or all or a portion of the circuits can be included on one chip. For example, the tuner 3 can be integrated in the same integrated circuit with a different circuit, or located on a separate integrated circuit.

An LSI was referred to above, but according to its degree of integration, it may be called an IC (Integrated Circuit), system LSI, super LSI, or ultra LSI. The method for integrating the circuit is not limited to LSI, but can also be implemented via a dedicated circuit or a generic processor. An FPGA (Field Programmable Gate Array) which can be programmed after production of the LSI, or a reconfigurable processor in which the connections and settings of the circuit cells in the LSI can be reconfigured, could also be used.

Furthermore, if integrated circuit technology that replaces LSIs via advances in semiconductor technology or other technology appears, then of course the function block can be integrated using that technology. For example, the application of biotechnology, etc. is plausible.

(6) In the embodiment, the OFDM method was described as an example of a multi-carrier method, but any kind of other multi-carrier method can be used.

INDUSTRIAL APPLICABILITY

The present invention can be used in a digital television receiver, i.e. a receiving apparatus for digital terrestrial broadcasting, in a radio receiver, etc.

REFERENCE SIGNS LIST

100 Receiving apparatus (digital television receiver)
101 Antenna
102 Tuner
103 Synchronizing unit
104 FFT unit
105 Channel characteristics calculation unit
106 Autocorrelation calculation unit
107 Noise power estimation unit
108 Tap coefficient calculation unit
109 Filtering unit
110 Equalizing unit
111 Channel characteristics estimation unit
171 TMCC extraction unit
172 TMCC decoding unit
173 TMCC remodulation unit
181 Autocorrelation matrix generation unit
182 Inverse matrix calculation unit
183 Identity matrix generation unit
184 Coefficient calculation unit

The invention claimed is:

1. A receiving apparatus comprising:
a conversion unit operable to convert a received signal, the signal being transmitted by a multi-carrier transmission method, from a time domain into a frequency domain;
a noise power estimation unit operable to estimate, in accordance with the signal converted into the frequency domain, a noise power included therein;
a channel characteristics estimation unit operable to estimate channel characteristics in accordance with a reference signal included in the signal converted into the frequency domain;
an autocorrelation calculation unit operable to calculate an autocorrelation value for the estimated channel characteristics;
a tap coefficient calculation unit operable to calculate tap coefficients in accordance with the noise power estimated by the noise power estimation unit and the autocorrelation value calculated by the autocorrelation calculation unit; and
a filtering unit operable to perform filtering on the channel characteristics in accordance with the tap coefficients calculated by the tap coefficient calculation unit.

2. The receiving apparatus in claim 1, wherein
the tap coefficient calculation unit includes:
an autocorrelation matrix generation subunit operable to generate an autocorrelation matrix in accordance with the autocorrelation value;
an inverse matrix calculation subunit operable to calculate an inverse matrix for the autocorrelation matrix; and
a coefficient calculation subunit operable to calculate tap coefficients for a noise removal filter by multiplying each element in the inverse matrix by the noise power and subtracting the result from an identity matrix.

3. The receiving apparatus in claim 2, wherein
the inverse matrix calculation subunit adds a pre-established offset component to diagonal elements in the autocorrelation matrix.

4. A method for receiving, comprising the steps of:
converting a received signal, the signal being transmitted by a multi-carrier transmission method, from a time domain into a frequency domain;
estimating, in accordance with the signal converted into the frequency domain, a noise power included therein;
estimating channel characteristics in accordance with a reference signal included in the signal converted into the frequency domain;
calculating an autocorrelation value for the estimated channel characteristics;
calculating tap coefficients in accordance with the noise power estimated by the noise power estimation step and the autocorrelation value calculated by the autocorrelation calculation step; and
performing filtering on the channel characteristics in accordance with the tap coefficients calculated by the tap coefficient calculation step.

5. An integrated circuit comprising:
a conversion unit operable to convert a received signal, the signal being transmitted by a multi-carrier transmission method, from a time domain into a frequency domain;
a noise power estimation unit operable to estimate, in accordance with the signal converted into the frequency domain, a noise power included therein;
a channel characteristics estimation unit operable to estimate channel characteristics in accordance with a reference signal included in the signal converted into the frequency domain;
an autocorrelation calculation unit operable to calculate an autocorrelation value for the estimated channel characteristics;
a tap coefficient calculation unit operable to calculate tap coefficients in accordance with the noise power estimated by the noise power estimation unit and the autocorrelation value calculated by the autocorrelation calculation unit; and
a filtering unit operable to perform filtering on the channel characteristics in accordance with the tap coefficients calculated by the tap coefficient calculation unit.

6. A digital television receiver comprising:
a conversion unit operable to convert a received signal, the signal being transmitted by a multi-carrier transmission method, from a time domain into a frequency domain;
a noise power estimation unit operable to estimate, in accordance with the signal converted into the frequency domain, a noise power included therein;
a channel characteristics estimation unit operable to estimate channel characteristics in accordance with a reference signal included in the signal converted into the frequency domain;
an autocorrelation calculation unit operable to calculate an autocorrelation value for the estimated channel characteristics;
a tap coefficient calculation unit operable to calculate tap coefficients in accordance with the noise power estimated by the noise power estimation unit and the autocorrelation value calculated by the autocorrelation calculation unit; and a filtering unit operable to perform filtering on the channel characteristics in accordance with the tap coefficients calculated by the tap coefficient calculation unit.

7. A computer program causing a computer to perform processing comprising the steps of:

converting a received signal, the signal being transmitted by a multi-carrier transmission method, from a time domain into a frequency domain;

estimating, in accordance with the signal converted into the frequency domain, a noise power included therein;

estimating channel characteristics in accordance with a reference signal included in the signal converted into the frequency domain;

calculating an autocorrelation value for the estimated channel characteristics;

calculating tap coefficients in accordance with the noise power estimated by the noise power estimation step and the autocorrelation value calculated by the autocorrelation calculation step; and performing filtering on the channel characteristics in accordance with the tap coefficients calculated by the tap coefficient calculation step.

* * * * *